United States Patent
Mu et al.

(10) Patent No.: US 7,093,451 B2
(45) Date of Patent: Aug. 22, 2006

(54) BLOWOFF VALVE ASSEMBLY WITH INTEGRATED PRESSURE SWITCH

(75) Inventors: Xiaoxia Mu, East Amherst, NY (US); Taylor R. Eckstein, Jr., N. Tonawanda, NY (US); William James Kumpf, Lockport, NY (US); Prasad Shripad Kadle, East Amherst, NY (US)

(73) Assignee: Delphi Technologies, Inc., Troy, MI (US)

( * ) Notice: Subject to any disclaimer, the term of this patent is extended or adjusted under 35 U.S.C. 154(b) by 27 days.

(21) Appl. No.: 10/911,123

(22) Filed: Aug. 4, 2004

(65) Prior Publication Data

US 2005/0061010 A1  Mar. 24, 2005

Related U.S. Application Data

(60) Provisional application No. 60/504,586, filed on Sep. 18, 2003.

(51) Int. Cl.
   *F25B 45/00* (2006.01)
(52) U.S. Cl. .................... 62/149; 200/83 Q
(58) Field of Classification Search ............ 62/149, 62/228.1, 228.3, 324.6; 200/83 J, 83 R, 200/306
   See application file for complete search history.

(56) References Cited

U.S. PATENT DOCUMENTS

| 4,400,601 | A | * | 8/1983 | Brucken ................ 200/81.4 |
|---|---|---|---|---|
| 4,469,923 | A | * | 9/1984 | Charboneau ............ 200/83 P |
| 4,948,931 | A | * | 8/1990 | Nixon et al. ............ 200/83 P |
| 5,153,396 | A |   | 10/1992 | Cummings .............. 200/83 J |
| 5,461,208 | A | * | 10/1995 | McKenna ................ 200/83 J |
| 5,577,389 | A | * | 11/1996 | Albertson et al. ......... 62/115 |
| 5,644,930 | A | * | 7/1997 | Albertson et al. ......... 62/475 |
| 5,984,645 | A | * | 11/1999 | Cummings .............. 417/307 |
| 6,536,225 | B1 | * | 3/2003 | Yajima ...................... 62/407 |
| 6,758,052 | B1 | * | 7/2004 | Ghodbane et al. ......... 62/197 |
| 6,758,055 | B1 | * | 7/2004 | Watanabe et al. .......... 62/225 |
| 6,772,598 | B1 | * | 8/2004 | Rinehart ..................... 62/126 |
| 2005/0103029 | A1 | * | 5/2005 | Kawahara et al. ......... 62/126 |

FOREIGN PATENT DOCUMENTS

JP   2002-106927 A   *   4/2002

* cited by examiner

*Primary Examiner*—Mohammad M. Ali
(74) *Attorney, Agent, or Firm*—Patrick M. Griffin

(57) ABSTRACT

A blowoff valve assembly includes a diaphragm separating a refrigerant connection from an ambient port open to the atmosphere. The refrigerant connection is preferably connected to air conditioning system such that the diaphragm is in contact with refrigerant from the system. The diaphragm is deflectable based on the pressure of the refrigerant and is operatively connected to a switch. When pressure of the refrigerant drops to a predetermined level, the diaphragm deflects to activate the switch. Additionally, the assembly also includes a detonable squib that explodes and ruptures the diaphragm, allowing the refrigerant to flow from the refrigerant connection to the atmosphere. Additional features, such as sensors for detecting refrigerant outside of the system, a collision subsystem, and an associated controller are also disclosed.

21 Claims, 3 Drawing Sheets

BLOWOFF VALVE ASSEMBLY WITH INTEGRATED PRESSURE SWITCH

CROSS-REFERENCE TO RELATED PATENT APPLICATION

This application claims the benefit of provisional patent application Ser. No. 60/504,586 filed Sep. 18, 2003.

TECHNICAL FIELD

The subject invention relates to a blowoff valve assembly with an integrated pressure switch.

BACKGROUND OF THE INVENTION

Blowoff valve assemblies with integrated pressure switches are well known in the prior art. An example of such an assembly is disclosed in U.S. Pat. No. 5,153,396 (the '396 patent) to Cummings.

The assembly of the '396 patent includes a diaphragm which separates a refrigerant connection for connection to a refrigerant from an ambient port open to atmosphere. The diaphragm senses the pressure of the refrigerant. A switch is operatively connected to the diaphragm and is closed when the pressure of the refrigerant is at a standard level. As pressure of the refrigerant increases to a predetermined lower threshold, the switch opens to shut down a compressor in an attempt to stop the increase in pressure of the refrigerant. However, if the pressure of the refrigerant increase further to a predetermined upper threshold, an array of pins, positioned around the diaphragm, will puncture the diaphragm. The diaphragm then ruptures, allowing the refrigerant to ventilate from the refrigerant connection to the ambient port.

Although the assembly of the '396 patent may be effective apparatus to ventilate refrigerant from an air conditioning system in response to a high pressure condition, there remains an opportunity for an assembly for detecting a leak of a refrigerant and quickly ventilating the refrigerant to atmosphere.

SUMMARY OF THE INVENTION

A blowoff valve assembly comprises a housing defining a refrigerant connection for connection to a refrigerant and an ambient port open to the atmosphere. A diaphragm is supported by the housing to separate the refrigerant connection from the ambient port. A squib is detonable in response to an event signal. The explosion of the squib creates a force which ruptures the diaphragm to allow the refrigerant to flow from the refrigerant connection to the ambient port.

Accordingly, the assembly provides a fast-acting apparatus for ventilating refrigerant from an air conditioning system in response to an event, such as the detection of a leak of the refrigerant from the system.

BRIEF DESCRIPTION OF THE DRAWINGS

Other advantages of the present invention will be readily appreciated as the same becomes better understood by reference to the following detailed description when considered in connection with the accompanying drawings wherein.

DESCRIPTION OF THE PREFERRED EMBODIMENT

Figure 1:
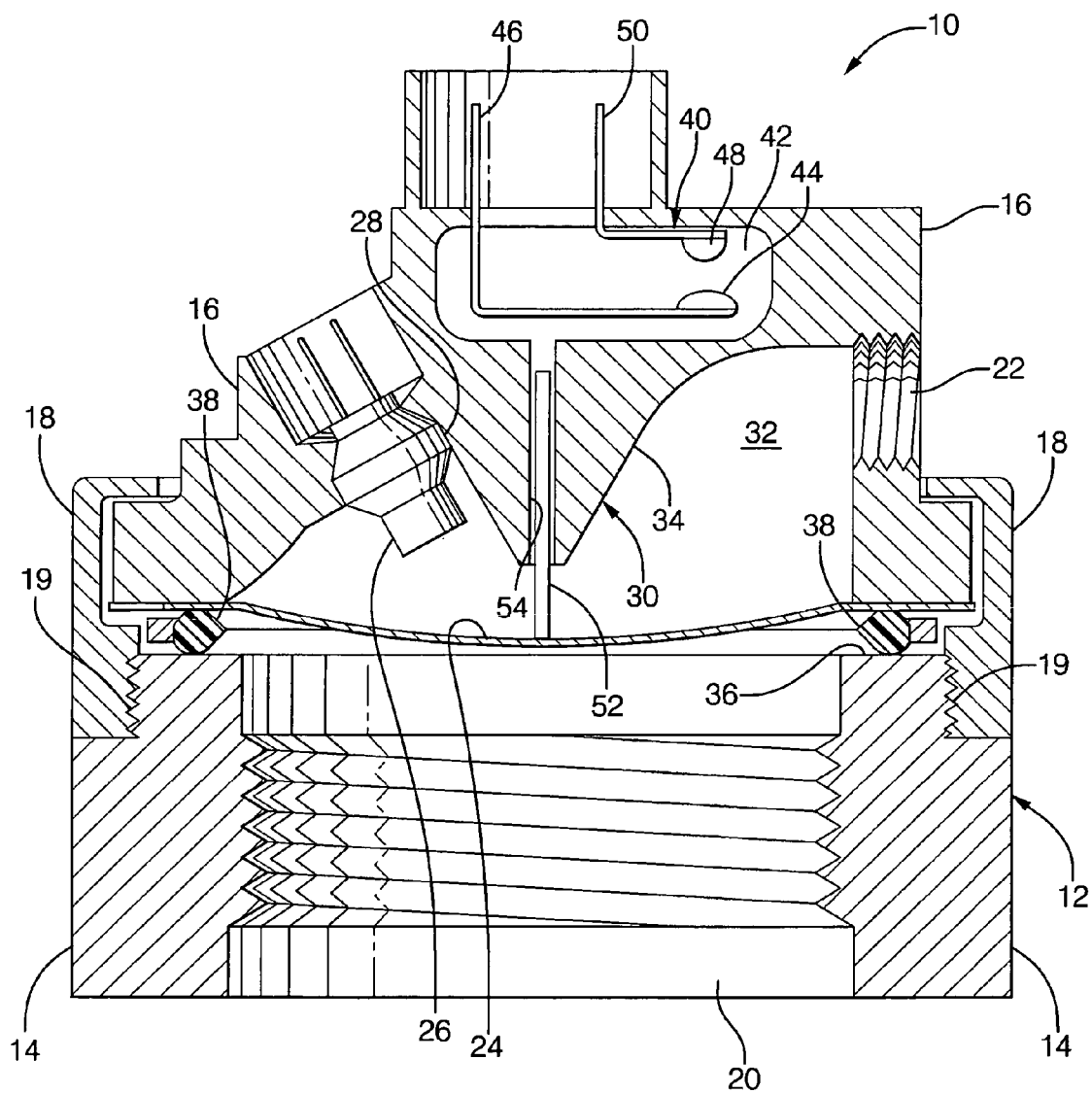
FIG. 1 is a cross-sectional view of a blowoff valve assembly with an integrated pressure switch in an open position.

Referring to the Figures, wherein like numerals indicate like parts throughout the several views, a blowoff valve assembly is shown at 10 in FIG. 1.

A housing 12 preferably includes a first portion 14, a second portion 16, and a third portion 18. The first portion 14 of the housing 12 defines a refrigerant connection 20 for connection to a refrigerant. The second portion 16 of the housing 12 defines an ambient port 22 open to the atmosphere. A diaphragm 24 separates the refrigerant connection 20 from the ambient port 22. The diaphragm 24 is supported by the third portion 18 of the housing 12. The third portion 18 also serves to secure the second portion 16 to the first portion 14. Other configurations for the housing 12 are possible, aside from the portions 14, 16, 18 described herein.

The assembly 10 includes a squib 26. The second portion 16 of the housing 12 defines a seat 28 for housing the squib 26. The squib 26 is detonable in response to an event signal. The explosion of the squib 26 creates a force which ruptures the diaphragm 24 and allows the refrigerant to flow from the refrigerant connection 20 to the ambient port 16. The squib 26 is sized and positioned such that the force of the explosion is sufficient to rupture the diaphragm 24.

A protrusion 30 extends from the second portion 16 of the housing 12 toward the diaphragm 24. The protrusion 30 defines a passageway 32 for flow of the refrigerant between the refrigerant connection 20 and the ambient port 22. The protrusion is preferably conical shaped to provide a slope 34 in the passageway 32.

The diaphragm 24 is deflectable in response to changes in pressure of the refrigerant. An outer edge of the diaphragm 24 is fixed by attachment to the housing 12, allowing a center portion of the diaphragm 24 to deflect with changes in pressure. Preferably, the diaphragm 24 is disc-shaped and formed of stainless steel. Stainless steel will resist corrosion of the diaphragm 24 over time. Those skilled in the art realize that the diaphragm 24 may be formed in other shapes and of different materials.

A shelf 36 is also defined by the first portion 14 of the housing 12. A seal 38 is supported by the shelf 36 and disposed between the diaphragm 24 and the refrigerant connection 20. The seal 38 prevents the refrigerant from leaking around the diaphragm 24 to travel from the refrigerant connection 20 to the ambient port 22. The seal 38 is preferably an O-ring to match with the preferred disc-shaped diaphragm 24.

A switch 40 is operatively connected to the diaphragm 24 for detecting a predetermined level of pressure of the refrigerant. Preferably, the second portion 16 of the housing 12 defines a cavity 42 above the protrusion 30 to contain the switch 40. It is preferred that the switch 40 include a movable contact 44 electrically connected to a first terminal 46 and a stationary contact 48 electrically connected to a second terminal 50. A transfer pin 52 interacts between the switch 40 and the diaphragm 24 to actuate the switch 40 in response to deflection of the diaphragm 24. The protrusion 30 preferably defines a void 54 through which the transfer pin 52 is disposed.

Figure 2:
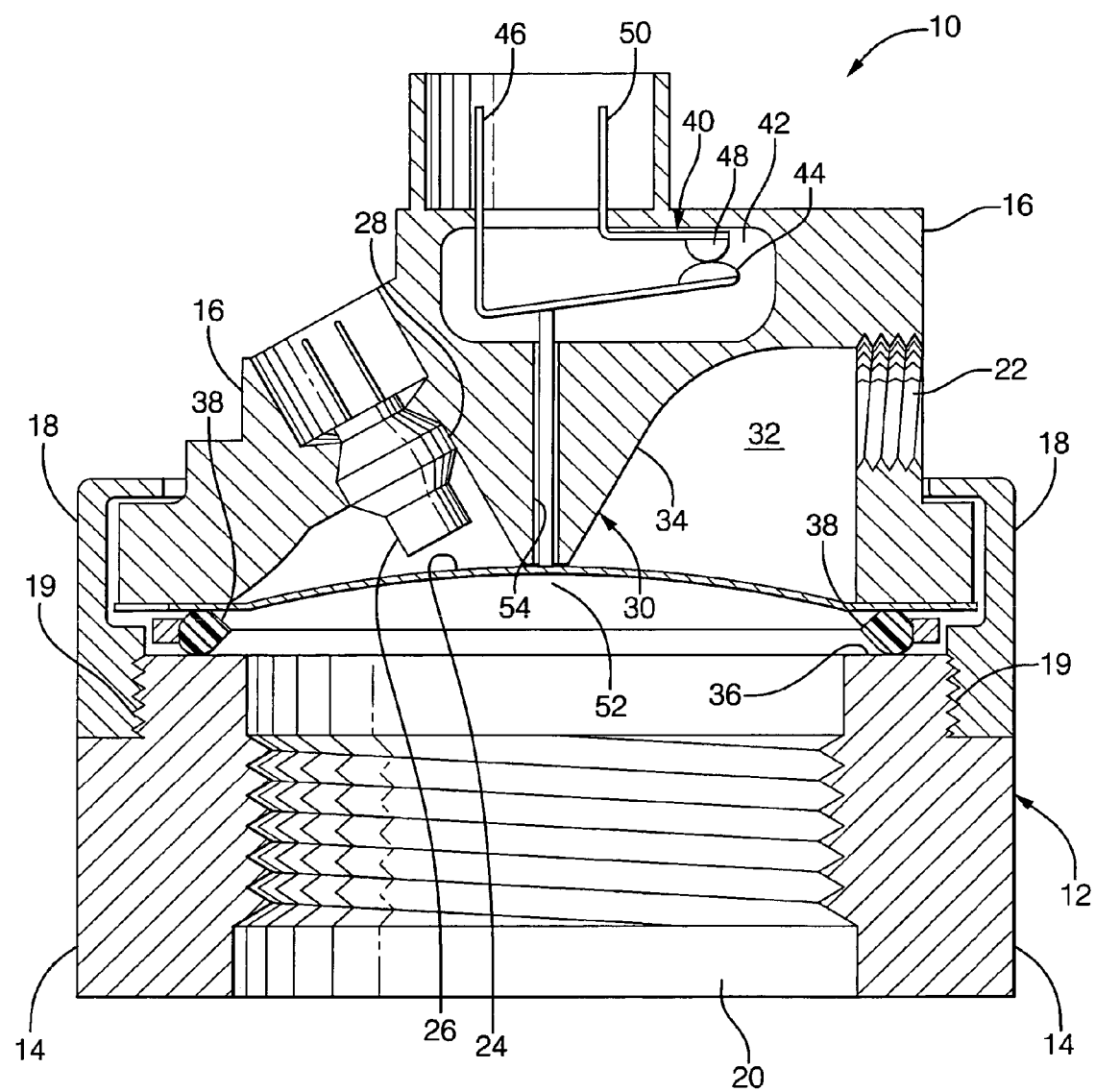
FIG. 2 is a cross-sectional view of the blowoff valve assembly with the switch in a closed position due to a predetermined level of pressure of the refrigerant being applied to the diaphragm.

The contacts 44, 48 of the switch 40, as illustrated in FIG. 1, have a "normally open" configuration. When the pressure of the refrigerant is at a first level, the diaphragm 24 is deflected such that the transfer pin 52 maintains the movable contact 44 apart from the stationary contact 48. When the contacts 44, 48 are apart from each other, electricity is not conducted between the contacts 44, 48. Should the pressure of the refrigerant decrease from the first level to the predetermined level, the deflection of the diaphragm 24 changes, as shown in FIG. 2. When this change in deflection of the diaphragm 24 occurs, the movable contact 44 makes an electrical connection with the stationary contact 48, so that electricity is conducted between the contacts 44, 48. Alternatively, those skilled in the art realize that the switch 40 can also be configured with a "normally closed" configuration. Likewise, the switch 40 may be configured with additional sets of contacts.

Figure 3:
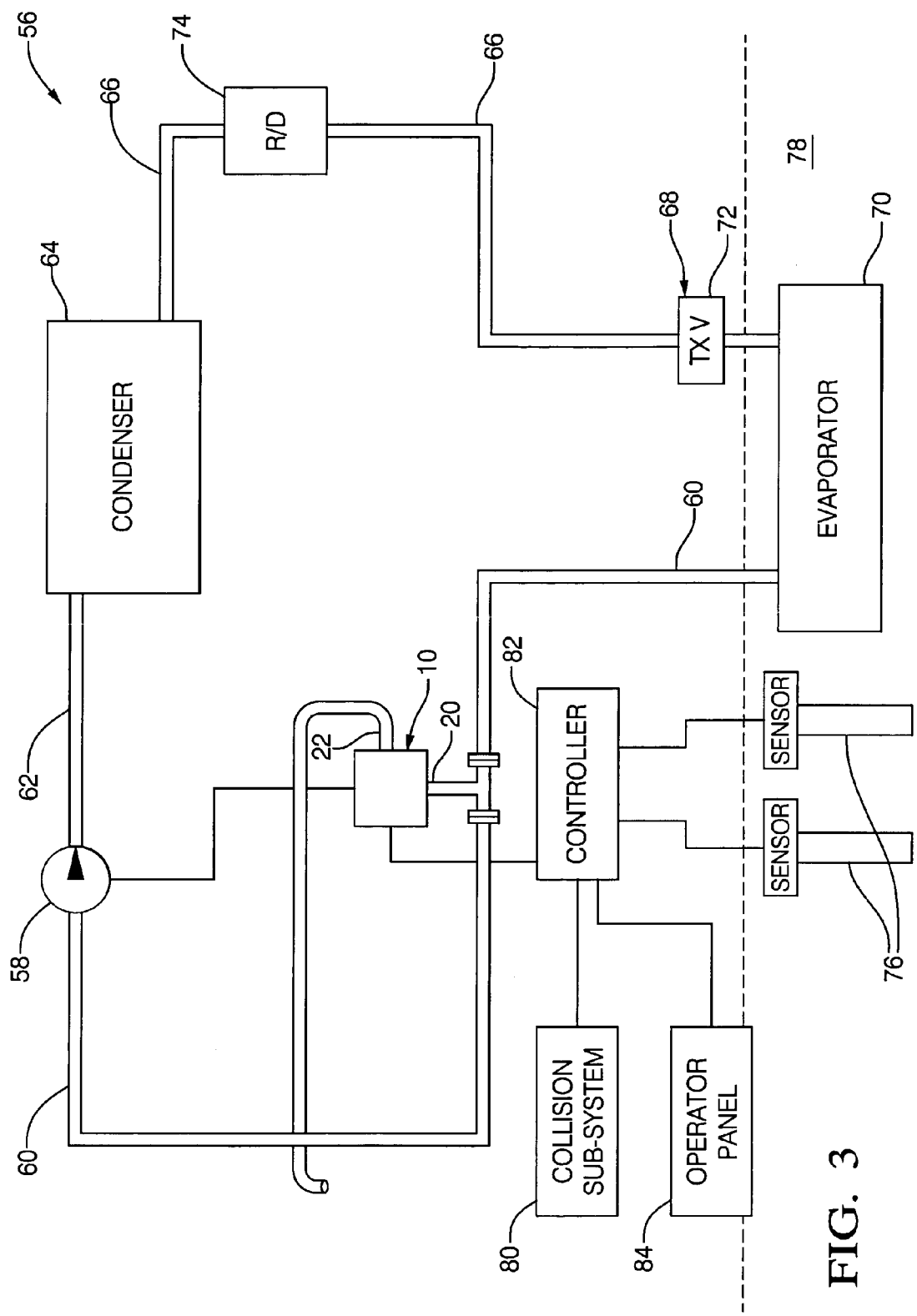
FIG. 3 is a schematic view of an air conditioning system showing an implementation of the blowoff valve assembly.

Referring to FIG. 3, the assembly 10 is preferably implemented within an air conditioning system 56 that circulates the refrigerant. It is further preferred that the air conditioning system 56 is located in a vehicle. However, those skilled in the art realize the air conditioning system 56 can alternatively be implemented into a building, an industrial cooling system, a refrigerator, etc.

It is preferred that the refrigerant used in the system 56 is type R-152a refrigerant. Type R-152a refrigerant is mildly flammable, having a flammable range of 4 to 17 percent concentration with air. Therefore, it is critical to keep the R-152a refrigerant away from any possible ignition sources, such as spark plugs, cigarette lighters, etc. Those skilled in the art will appreciate that other refrigerants could also be used in alternative embodiments of the system 56. These other refrigerants include, but are not limited to carbon dioxide ($CO_2$), R-12/CFC-12, R-134a/HFC-134a, and propane.

The system 56 includes a compressor 58 operatively connected to a suction line 60. The compressor 58 compresses the refrigerant into a high-pressure gaseous state. A gas line 62 is operatively connected to the compressor 58 to receive the refrigerant from the compressor 58. A condenser 64 is operatively connected to the gas line 62 for cooling and liquefying the refrigerant. The refrigerant is received by a liquid line 66 operatively connected to the condenser 64. A meter 68 is operatively connected to the liquid line 66 for restricting a flow of the refrigerant. An evaporator 70 receives the restricted flow of refrigerant from the meter 68 for cooling air flowing through the evaporator 70. The evaporator 70 is also operatively connected to the suction line 60 for removing the refrigerant from the evaporator 70. In a first embodiment, the meter 68 is embodied as a thermostatic expansion valve (TXV) 72. In this first embodiment, a receiver/drier 74 is connected inline with the liquid line 66. In a second embodiment, the meter 68 may be embodied as an orifice tube (not shown) while an accumulator/dehydrator (not shown) is connected inline with the suction line 60.

The refrigerant connection 20 of the blowoff valve assembly 10 is preferably connected to the suction line 60. However, those skilled in the art realize that the refrigerant connection 20 could alternatively be connected to the gas line 62, the liquid line 66, or other components of the air conditioning system 56. Additional blowoff valve assemblies 10 could also be utilized in the system 56 based on desired ventilation times, etc.

It is preferred that the switch 40 of the blowoff valve assembly 10 is electrically connected to the compressor 58. The compressor 58 is then activated and deactivated in response to changes in pressure of the refrigerant as sensed by the diaphragm 24. Those skilled in the art realize the switch 40 may be used to serve other functions within the air conditioning system 56.

A sensor 76 is preferably disposed in an air space 78 surrounding the evaporator 70. The sensor 76 senses refrigerant in the air space 78 that has leaked from the air conditioning system 56. When refrigerant is detected, the sensor 76 produces the event signal which causes the squib 26 to detonate. Depending on the reliability of the sensor 78, more than one sensor 78 may be required. Various types of acceptable sensors 78 are well known to those skilled in the art. These types include, but are not limited to, sensors 78 utilizing infrared light or a heating element.

A collision subsystem 80 is also preferably implemented with the system 56, especially when the system 56 is installed within the vehicle. The collision subsystem 80 detects a collision of the vehicle which could potentially cause a leak of refrigerant from the system 56. Upon detection of the collision, the subsystem 80 sends the event signal to the squib 26, causing the squib 26 to detonate.

It is preferred that a controller 82 is operatively connected to the squib 26. The controller 82 works in conjunction with the sensor 76 and the collision subsystem 80 to send the event signal to the squib 26. Those skilled in the art realize that the use of a controller 82 is not inherently necessary, and that the sensor 76 and the collision subsystem 80 may be connected directly to the squib 26 to initiate detonation of the squib 26.

An operator panel 84 is also electrically connected to the controller 82. The operator panel 84 can be an instrument panel, an electronic display, or other similar mechanism to convey messages to an operator. The controller 82 sends a blowoff message to the operator panel 84 in response to the squib 26 being detonated. The blowoff message notifies the operator that the air conditioning system 56 is non-functional and must be serviced.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A blowoff valve assembly comprising:
   a housing defining a refrigerant connection for connection to a refrigerant and an ambient port open to the atmosphere;
   a diaphragm supported by said housing for separating said refrigerant connection from said ambient port; and
   a squib detonable in response to an event signal for creating a force to rupture said diaphragm to allow the refrigerant to flow from said refrigerant connection to said ambient port.

2. An assembly as set forth in claim 1 wherein said diaphragm is deflectable in response to changes in pressure of the refrigerant and further comprising a switch operatively connected to said diaphragm for detecting a predetermined level of said pressure of the refrigerant.

3. An assembly as set forth in claim 2 wherein said housing further defines a seat for holding said squib.

4. An assembly as set forth in claim 3 further comprising a protrusion from said housing defining a passageway for flow of the refrigerant between said refrigerant connection and said ambient port and separating said passageway from said seat.

5. An assembly as set forth in claim 4 wherein said protrusion is generally conical shaped for providing a slope for said passageway.

6. An assembly as set forth in claim 4 further comprising a transfer pin interacting between said switch and said diaphragm for actuating said switch in response to deflection of said diaphragm.

7. An assembly as set forth in claim 6 wherein said protrusion defines a void through which said transfer pin is disposed.

8. An assembly as set forth in claim 7 wherein said housing further defines a cavity above said protrusion for containing said switch.

9. An assembly as set forth in claim 1 wherein said diaphragm is further defined as a disc.

10. An assembly as set forth in claim 9 wherein said disc is formed of a metal.

11. An assembly as set forth in claim 10 wherein said metal is further defined as stainless steel.

12. An assembly as set forth in claim 1 further comprising a seal disposed between said diaphragm and said refrigerant connection for preventing the refrigerant from leaking around said diaphragm from said refrigerant connection to said ambient port.

13. An assembly as set forth in claim 1 wherein said housing further defines a shelf for support of said seal.

14. An air conditioning system comprising:
a compressor operatively connected to a suction line for compressing a refrigerant into a high-pressure gaseous state;
a gas line operatively connected to said compressor for receiving the refrigerant;
a condenser operatively connected to said gas line for cooling and liquefying the refrigerant;
a liquid line operatively connected to said condenser for receiving the refrigerant;
a meter operatively connected to said liquid line for restricting a flow of the refrigerant;
an evaporator connected to said meter for receiving the refrigerant and to said suction line for removing the refrigerant for cooling air flowing through said evaporator;
a blowoff valve assembly including a housing defining a refrigerant connection for connection to one of said lines and an ambient port open to the atmosphere, a diaphragm supported by said housing for separating said refrigerant connection from said ambient port; and
said assembly of said system further including a squib detonable in response to an event signal for creating a force to rupture said diaphragm to allow the refrigerant to flow from said refrigerant connection to said ambient port.

15. A system as set forth in claim 14 wherein said diaphragm is deflectable in response to changes in pressure of the refrigerant and further comprising a switch operatively connected to said diaphragm for detecting a predetermined level of said pressure of the refrigerant.

16. A system as set forth in claim 14 further comprising a sensor for disposition in an air space surrounding said evaporator for sensing the refrigerant in the air space and producing said event signal.

17. A system as set forth in claim 14 further comprising a collision subsystem for detecting a collision which produces a leak of refrigerant and producing said event signal.

18. A system as set forth in claim 17 further comprising a collision subsystem for detecting a collision which produces a leak of refrigerant and producing said event signal.

19. A system as set forth in claim 18 further comprising a controller operatively connected to said squib to work in conjunction with at least one of said sensor and said collision subsystem for sending said event signal to said squib.

20. A system as set forth in claim 19 further comprising an operator panel electrically connected to said controller for displaying a message to an operator in response to detonation of said squib.

21. A system as set forth in claim 15 wherein said switch (40) is electrically connected to said compressor for activating and deactivating said compressor in response to in response to changes in pressure of the refrigerant.

* * * * *